US007644932B2

(12) United States Patent
Heng

(10) Patent No.: US 7,644,932 B2
(45) Date of Patent: Jan. 12, 2010

(54) GAP-CLEARING MECHANISM FOR WHEELCHAIR

(75) Inventor: Kok Hui John Gerard Heng, Singapore (SG)

(73) Assignee: Nanyang Technological University, Singapore (SG)

( * ) Notice: Subject to any disclaimer, the term of this patent is extended or adjusted under 35 U.S.C. 154(b) by 254 days.

(21) Appl. No.: 11/751,633

(22) Filed: May 22, 2007

(65) Prior Publication Data

US 2007/0267843 A1 Nov. 22, 2007

Related U.S. Application Data

(60) Provisional application No. 60/802,159, filed on May 22, 2006.

(51) Int. Cl.
*A61G 5/06* (2006.01)
*B62B 5/02* (2006.01)

(52) U.S. Cl. ................. 280/5.24; 280/304.1; 280/250.1

(58) Field of Classification Search .................. 280/5.2, 280/5.24, 5.28, 5.3, 5.32, 9, 10, 250.1, 304.1
See application file for complete search history.

(56) References Cited

U.S. PATENT DOCUMENTS 73,398 A * 1/1868 Smith ......................... 414/469
865,514 A * 9/1907 Mullenmeister ........... 280/47.2
887,821 A * 5/1908 Lang ......................... 280/5.24
1,084,465 A * 1/1914 Mercer .......................... 280/9
1,217,200 A * 2/1917 Miller et al. ................... 280/9
1,873,836 A * 8/1932 Francke ......................... 280/9
1,903,115 A * 3/1933 Kern ....................... 280/43.23
2,682,076 A * 6/1954 Christensen ................... 16/99
3,104,112 A * 9/1963 Crail .......................... 280/5.2
3,869,146 A * 3/1975 Bulmer .................... 280/250.1
4,455,029 A * 6/1984 Taylor ....................... 280/5.28
5,022,669 A * 6/1991 Johnson ....................... 280/30
5,137,295 A * 8/1992 Peek ....................... 280/304.1
5,620,189 A * 4/1997 Hinderhofer ............... 280/5.24
2003/0122327 A1* 7/2003 Wu ............................ 280/5.2
2006/0113137 A1* 6/2006 Lin ............................ 180/244

FOREIGN PATENT DOCUMENTS

GB 2258196 A * 2/1993

* cited by examiner

*Primary Examiner*—Lesley D Morris
*Assistant Examiner*—Wesley Potter
(74) *Attorney, Agent, or Firm*—Birch, Stewart, Kolasch & Birch, LLP

(57) ABSTRACT

A gap-clearing mechanism for attachment to a wheelchair is disclosed. The gap-clearing mechanism has a lower member for attachment to the wheelchair, and an upper member spaced from and parallel to the lower member and being moveable relative thereto. The upper member has at least one support column securely attached thereto and depending therefrom. The at least one support column is slideably mounted relative to the lower member. There is a wheel assembly at a lower end of the at least one support column. The wheel assembly is moveable between a retracted position and an extended position. A wheelchair fitted with two such gap-clearing mechanisms is also disclosed.

32 Claims, 4 Drawing Sheets

GAP-CLEARING MECHANISM FOR WHEELCHAIR

REFERENCE TO RELATED APPLICATION

Reference is made to my earlier U.S. provisional patent application No. 60/802,159 filed May 22, 2006 for an invention titled "Gap clearing mechanism for wheelchair" the priority of which is hereby claimed, and the contents of which are hereby incorporated by reference as if disclosed herein in their entirety.

TECHNICAL FIELD

This invention relates to a gap-clearing mechanism for wheelchairs and refers particularly, though not exclusively, to such a mechanism that is retractable when not in use.

BACKGROUND

Those on wheelchairs have some difficulty in boarding and alighting from public transport vehicles such as, for example, buses, trams and trains, as such public transport vehicles often have a gap that has to be crossed on boarding or alighting. For busses and trams, one solution is to fit low floor buses with a powered ramp that can be lowered onto the curb at an entry/exit door to form a negotiable bridge to allow the wheelchair to roll from the curb onto the bus or from the bus onto the curb. However, it is expensive to fit each bus and tram with such a powered ramp. Their use significantly increases the time taken for boarding and alighting. Another solution is to have a suspension system on the curb side of the bus or tram that enables the curb side to be lowered. This still leaves a gap for wheelchairs and is mainly used for elderly passengers.

A final solution was to have wheel chairs with continuous tracks that can cross gaps. Such wheelchairs are specifically built, are bulky and expensive, and have not met with success.

SUMMARY

According to a preferred aspect there is provided a gap-clearing mechanism for attachment to a wheelchair. The gap-clearing mechanism comprises a lower member for attachment to the wheelchair and an upper member spaced from and parallel to the lower member and being moveable relative thereto. The upper member has at least one support column securely attached thereto and depending therefrom. The at least one support column is slideably mounted relative to the lower member. There is a wheel assembly at a lower end of the at least one support column. The wheel assembly is moveable between a retracted position and an extended position.

According to a second preferred aspect there is provided a wheelchair comprising two gap clearing mechanisms, there being one gap-clearing mechanism on each side of the wheelchair, each gap-clearing mechanism comprises a lower member for attachment to the wheelchair and an upper member spaced from and parallel to the lower member and being moveable relative thereto. The upper member has at least one support column securely attached thereto and depending therefrom. The at least one support column is slideably mounted relative to the lower member. There is a wheel assembly at a lower end of the at least one support column. The wheel assembly is moveable between a retracted position and an extended position.

For both aspects, there may also be a handle for pivotal movement between a first position and a second position to effect movement of the wheel assembly between the retracted position and the extended position. The at least one support column may be slideably mounted in corresponding at least one opening through the lower member. There may also be at least one compression spring extending between the upper member and the lower member; the at least one compression spring being around the at least one support column. There may further be provided a track on a top plate securely attached to the upper member for engagement thereby of a roller at a lower end of the handle; the roller being for movement between a first roller position towards a rear of the track and where the handle is in the first position; to a second roller position at a front of the track and where the handle is in the second position. The at least one support column may be able to move relative to the lower member in the direction of a longitudinal axis of the at least one support column, but not laterally. The handle may be pivotally mounted to a base plate intermediate the length of the handle and comprises an outer portion and an inner portion, the outer portion and the inner portion being joined by an offset portion. The at least one compression spring may provide an upward lifting force on the upper member to assist in the lifting the wheel assembly off the ground as the handle is moved from the second position to the first position. When in the second position the handle may have a sense of locking as the roller moves past a top-dead-centre of the upper member. The roller may be adapted to push on the top plate to force the upper member and thus the at least one support column downwardly. The at least one compression spring may be compressed by movement of the upper member under the action of the roller. When the wheel assembly is in the extended position the wheel assembly may not be lower than a major wheel of the wheelchair to enable the major wheel to contact the ground to retain the ability to drive the wheelchair. The wheel assembly, when in the extended position, may limit the wheelchair so that it can only move in a straight line and is unable to turn. The wheel assembly may comprise a plurality of wheels rotatably mounted between a pair of parallel and spaced-apart identical side plates. A forward wheel that is the most forward of the plurality of wheels may be elevated relative to the others of the plurality of wheels; and the side plates may be angled upwardly at their front end. The major wheel may be rotatably mounted to the lower member by an axle that may engage a bearing that locates in a through-hole in the lower member. Each gap-crossing mechanism may be located between a main frame of the wheelchair and each major wheel.

BRIEF DESCRIPTION OF THE DRAWINGS

In order that the invention may be fully understood and readily put into practical effect there shall now be described by way of non-limitative example only exemplary embodiments of the present invention, the description being with reference to the accompanying illustrative drawings.

In the drawings.

DETAILED DESCRIPTION OF EXEMPLARY EMBODIMENTS

Figure 1:
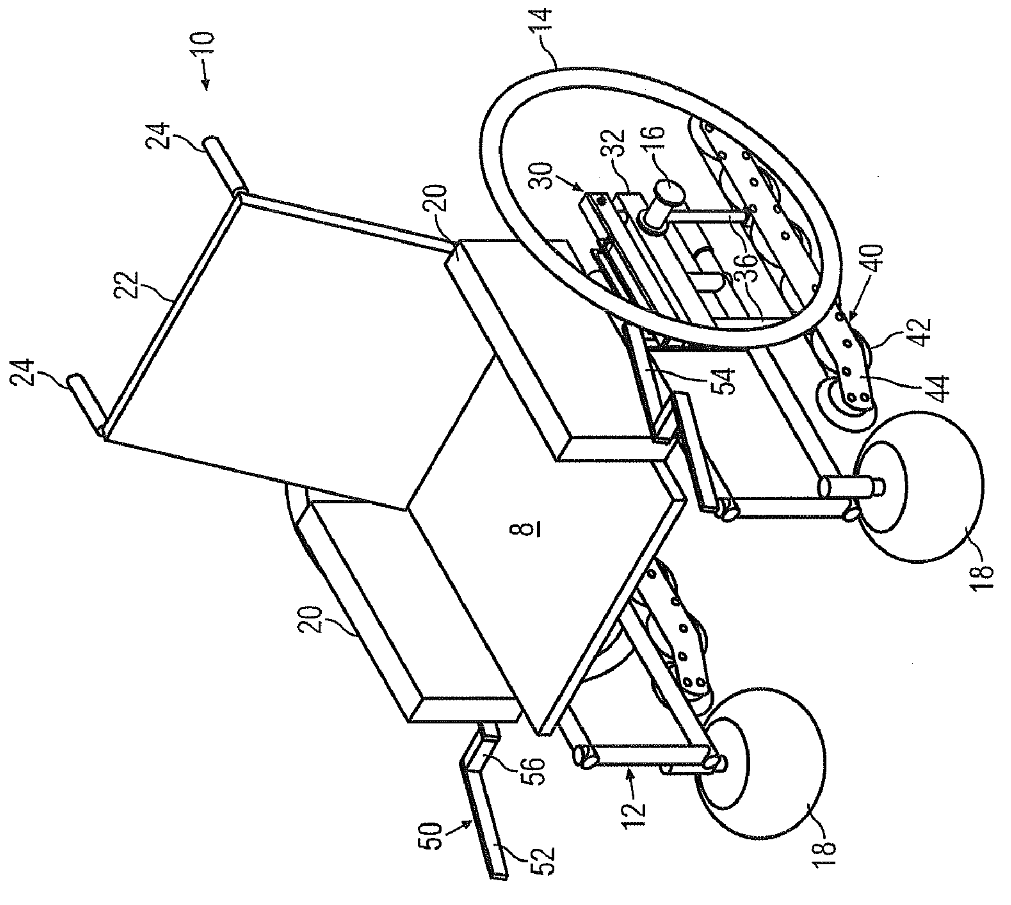
FIG. 1 is a front perspective view of an exemplary embodiment 1 with the gap-clearing mechanism in the retracted position.
Figure 2:
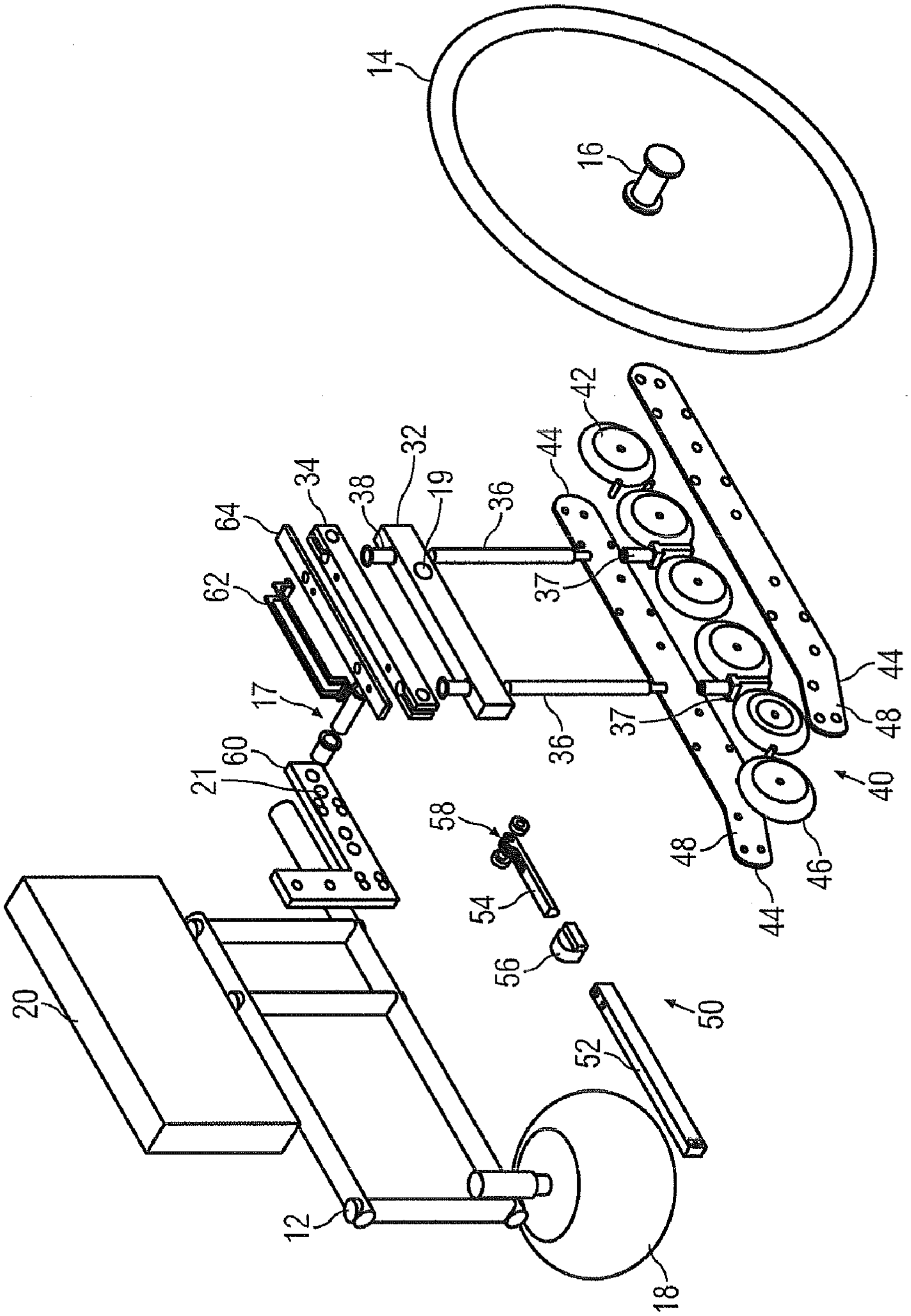
FIG. 2 is an exploded perspective view of one of the gap crossing mechanisms of FIG. 1.

As shown in the drawings there is a wheelchair 10 having:

a main frame generally represented as 12, a front castor 18 on each side of and rotatably mounted relative to the front of the main frame 12 and having a swept volume as shown, a seat handle 20 on each side of the main frame 12, a backrest 22 with handgrips 24, a seat 8, a gap-crossing mechanism 30 mounted on each side of the main frame 12, and a major wheel 14 on each side of and rotatably mounted to gap crossing mechanism 30 by an axle 16, the gap-crossing mechanism 30 being located between the main frame 12 and each major wheel 14. The axle 16 engages a bearing 17 that locates in through-hole 19 in the gap crossing mechanism 30.

Each of the two gap-crossing mechanisms 30 has a lower member 32 to which the axle 16 is securely and pivotally attached intermediate the length of the lower member 32; and an upper member 34 generally parallel to and spaced from the lower member 32. The upper member 34 is not attached to the axle 16 or the main frame 12.

Securely attached to the upper member 34 adjacent each end thereof and depending therefrom are two spaced-apart and generally parallel support columns 36 that slideably pass through corresponding openings through the lower member 32. There may be any suitable number of support columns 36 from one to several. The support columns 36 may be of any suitable size or shape provided they have the structural strength and length to be able to perform as described below. However, they are preferably in the form of elongate cylinders, rods or tubes. The support columns 36 are able to move relative to the lower member 32 in the direction of the longitudinal axis of each of the support columns 36, but not laterally.

Either or both of the support columns 36 may have a compression spring 38 extending around the support column 36 between the upper member 34 and the lower member 32 to bias the upper member 34 away from the lower member 32 by acting on both the upper member 34 and the lower member 32.

Each support column 36 has a wheel assembly 40 attached to the lower end thereof. Each wheel assembly 40 has a plurality (6 as shown) of wheels 42 rotatably mounted between a pair of parallel and spaced-apart identical side plates 44. The wheel 46 that is the most forward of the wheels 42 is elevated relative to the other wheels, and the side plates 44 are angled upwardly at their front end 48. Each support column 36 locates in a receptor 37 securely attached to the side plates 44.

An operational handle 50 is provided. There may be one handle 50 for both gap-crossing mechanisms 30 (as shown), or a single handle 50 that operates both gap-crossing mechanisms 30. The handle 50 is pivotally mounted to a base plate 60 intermediate the length of the handle 50. The handle 50 may have an outer portion 52 and an inner portion 54 joined by an offset portion 56. At its innermost end the handle 50 has a roller 58 securely but rotatably attached to the inner portion 54. The roller 58 engages in a track 62 on an upper plate 64 secured to the upper surface of the upper member 34. The roller 58 is for movement between a first position towards the rear of track 62 and where the handle 50 is generally horizontal, or may be at an angle of up to about 45° to the horizontal with the handle 50 as shown in FIGS. 1 and 3 being at an angle of about 30°; to a second position at the front of track 62 and where the handle 50 is generally vertical (FIG. 4).

The bearing 17 may also be received in a second hole 21 in the base plate 60 so that the wheel 14 is rotatable relative to the gap-clearing mechanism 30 as well as the wheelchair frame 12. Also, this enables the upper and lower members 34, 32 to pivot relative to the wheelchair frame 12, as will be explained below.

Figure 3:
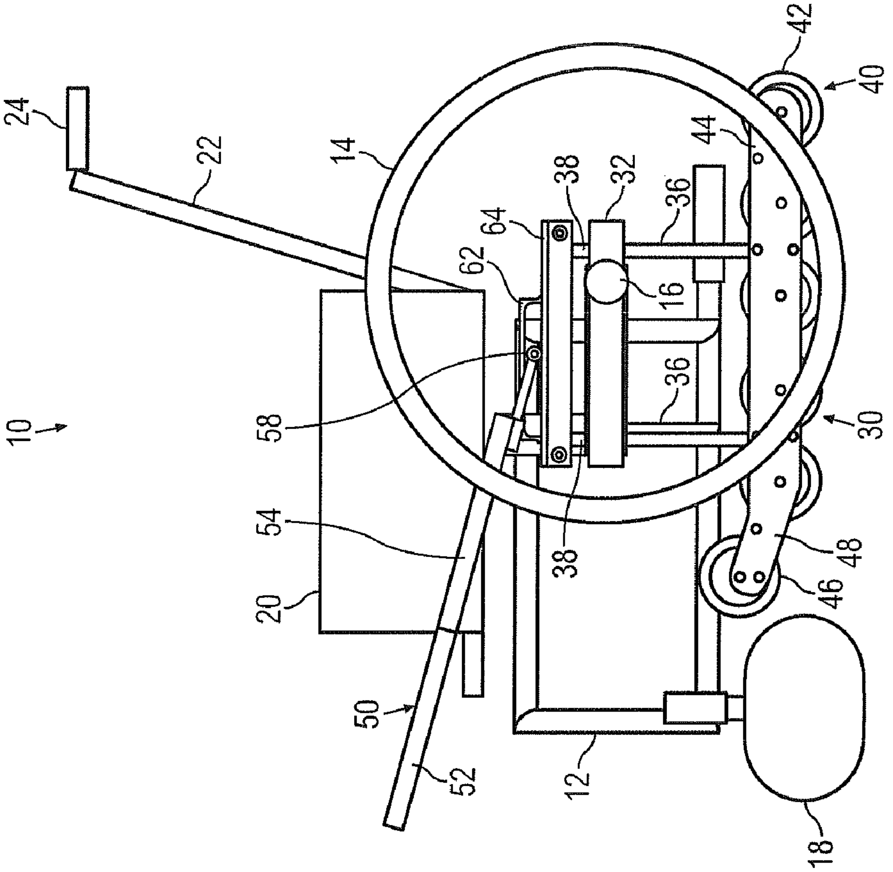
FIG. 3 is a side view of the exemplary embodiment of FIG. 1 with the gap-clearing mechanism in the retracted position.

The compression spring 38 provides an upward lifting force on the upper member 34 to thus assist in the lifting the wheel assembly 40 off the ground as the handle 50 is moved from the second position (FIG. 4) to the first position (FIG. 3). The direction of travel of the wheel assembly 40 is controlled by the support columns 36 and the handle 50. When in the first position (FIG. 3) the wheel assembly 40 is lifted off the ground with sufficient clearance for the wheelchair 10 to function normally. The gap-crossing mechanism 30 is therefore relatively unobtrusive, and the wheelchair 10 can still be collapsed for easy storage.

Figure 4:
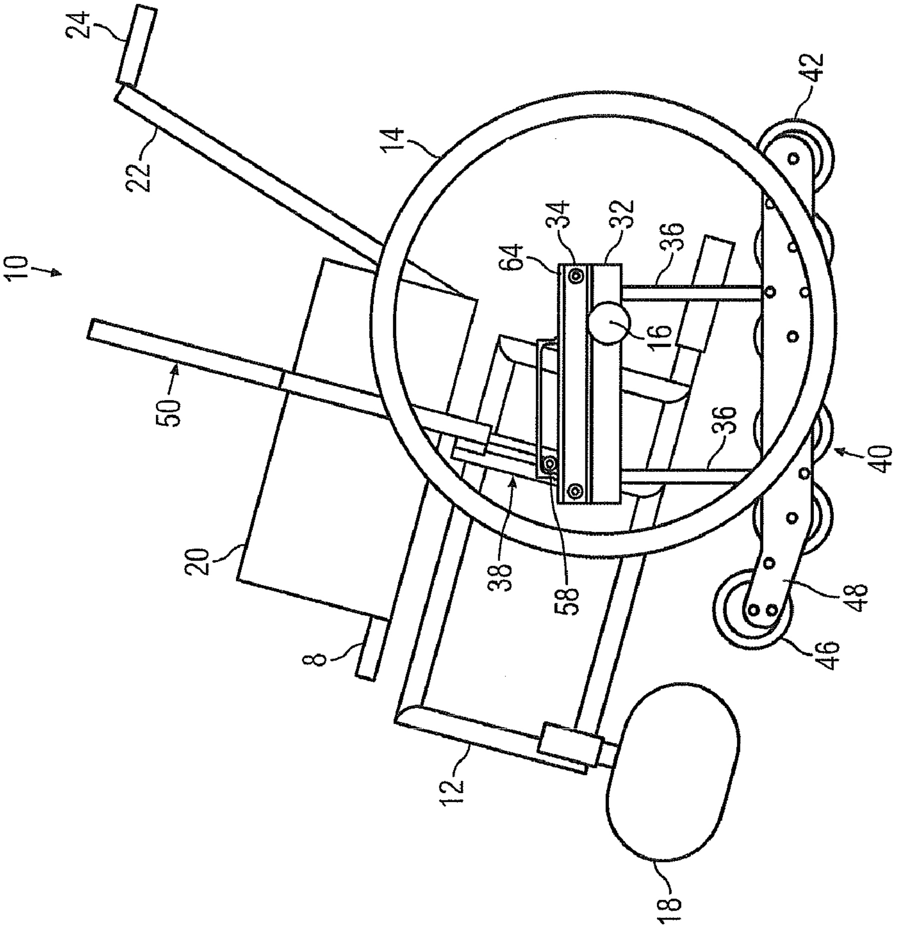
FIG. 4 is a side view of the exemplary embodiment of FIG. 1 with the gap-clearing mechanism in the extended position.

In the extended state (second position of FIG. 4), the gap-crossing mechanism 30 is moved to the position as shown in FIG. 4. To extend (lower) the wheel assembly 40, the handle 50 is moved from the first position (FIG. 3) to the second position (FIG. 4). In the second position the handle 50 will have a sense of locking as the roller 58 moves past the top-dead-centre of the upper member 34. The roller 58 will then push on the top surface of the upper member 34 to force the upper member 34 and thus the support columns 36 downwardly. This will also compress the compression springs 38.

The action on the handle 50 therefore lowers the wheel assembly 40 until it is in contact with the ground, and the front of the wheelchair 10 is then lifted into the gap crossing position shown in FIG. 4 so that the castors 18 are above the ground. In doing so the wheelchair frame 12 pivots relative to the upper member 34 and lower member 32 as they remain parallel to the ground due to the wheel assemblies 40 engaging the ground and the support columns 36 remaining perpendicular to the ground. The movement to the gap crossing position moves the centre of gravity of the wheelchair 10 and the person in the wheelchair 10 to a position approximately above the centre of the major wheel 14 and the wheel assembly 40.

In the extended position the wheel assembly 40 should not be lower than the major wheel 14 and may be a small distance such as, for example, 5 to 10 mm, above the ground so that the major wheels 14 still contact the ground to retain the ability to drive the wheelchair 10.

The lowered wheel assembly 40 also limit the wheelchair 10 so that it can only move in a straight line (forwards or reverse), and is unable to turn without difficulty. Therefore, as the wheelchair crosses the gap, it moves in a straight line. After the gap-crossing mechanism 30 has been extended, the wheelchair 10 can move over the gap. When the gap has been cleared, the handle 50 is returned to the first position of FIG. 3.

The wheel position can also be adjusted forward or backward or the roller ski length adjusted to fit the preference of the user by relocating the attachment of the receptors 37 relative to the side plates 44 and/or the upper and lower members 34, 32 relative to the base plate 60.

As the gap crossing mechanism has the ability to lift the front caster wheels 18, an added functionality of the gap-crossing mechanism 30 is that the wheelchair 10 has the ability to overcome low single steps. With the front caster wheels 18 raised, the wheelchair 10 can be moved over the step before lowering the front caster wheels 18. The rear, major wheels 14 can then be moved over the low step.

Whilst there has been described in the foregoing description exemplary embodiments of the present invention, it will be understood by those skilled in the technology concerned that many variations in details of design, construction and/or operation may be made without departing from the present invention.

The invention claimed is:

1. A gap-clearing mechanism for attachment to a wheelchair, the gap-clearing mechanism comprising:

a lower member for attachment to the wheelchair;

an upper member spaced from and parallel to the lower member and being moveable relative thereto;

the upper member having at least one support column securely attached thereto and depending therefrom, the at least one support column being slideably mounted relative to the lower member; and a wheel assembly at a lower end of the at least one support column, the wheel assembly being moveable between a retracted position and an extended position.

2. A gap-clearing mechanism as claimed in claim 1 further comprising a handle for pivotal movement between a first position and a second position, to effect movement of the wheel assembly between the retracted position and the extended position.

3. A gap-clearing mechanism as claimed in claim 2 further comprising at least one compression spring extending between the upper member and the lower member; the at least one compression spring being around the at least one support column.

4. A gap-clearing mechanism as claimed in claim 3, wherein the at least one compression spring provides an upward lifting force on the upper member to assist in the lifting the wheel assembly off the ground as the handle is moved from the second position to the first position.

5. A gap-clearing mechanism as claimed in claim 2 further comprising a track on a top plate attached to the upper member for engagement thereby of a roller at a lower end of the handle; the roller being for movement between a first position towards a rear of the track and where the handle is in the first position; and a second position at a front of the track and where the handle is in the second position.

6. A gap-clearing mechanism as claimed in claim 5, wherein the roller is adapted to push on the top plate to force the upper member and thus the at least one support column downwardly.

7. A gap-clearing mechanism as claimed in claim 6, wherein the at least one compression spring is compressed by movement of the upper member under the action of the roller.

8. A gap-clearing mechanism as claimed in claim 2, wherein the handle is pivotally mounted to a base plate intermediate the length of the handle and comprises an outer portion and an inner portion, the outer portion and the inner portion being joined by an offset portion.

9. A gap-clearing mechanism as claimed in claim 1, wherein the at least one support column is slideably mounted in corresponding at least one opening through the lower member.

10. A gap-clearing mechanism as claimed in claim 1, wherein the at least one support column is able to move relative to the lower member in the direction of a longitudinal axis of the at least one support column, but not laterally.

11. A gap-clearing mechanism as claimed in claim 1, wherein when the wheel assembly is in the extended position the wheel assembly is not lower than a major wheel of the wheelchair.

12. A gap-clearing mechanism as claimed in claim 1, wherein the wheel assembly, when in the extended position, limits the wheelchair so that it can move in a straight line forwards or reverse and is unable to turn without difficulty.

13. A gap-clearing mechanism as claimed in claim 1, wherein the wheel assembly comprises a plurality of wheels rotatably mounted between a pair of parallel and spaced-apart identical side plates.

14. A gap-clearing mechanism as claimed in claim 13, wherein a forward wheel that is the most forward of the plurality of wheels is elevated relative to the others of the plurality of wheels; and the side plates are angled upwardly at their front end.

15. A wheelchair comprising two gap clearing mechanisms, there being one gap-clearing mechanism on each side of the wheelchair, each gap-clearing mechanism comprising:

a lower member attached to the wheelchair;

an upper member spaced from and parallel to the lower member and being moveable relative thereto;

the upper member having at least one support column securely attached thereto and depending therefrom, the at least one support column being slideably mounted relative to the lower member; and a wheel assembly at a lower end of the at least one support column, the wheel assembly being moveable between a retracted position and an extended position.

16. A wheelchair as claimed in claim 15 further comprising a handle for pivotal movement between a first position and a second position to effect movement of the wheel assembly between the retracted position and the extended position.

17. A wheelchair as claimed in claim 16 further comprising at least one compression spring extending between the upper member and the lower member; the at least one compression spring being around the at least one support column.

18. A wheelchair as claimed in claim 17, wherein the at least one compression spring provides an upward lifting force on the upper member to assist in the lifting the wheel assembly off the ground as the handle is moved from the second position to the first position.

19. A wheelchair as claimed in claim 16 further comprising a track on a top plate securely attached to the upper member for engagement thereby of a roller at a lower end of the handle; the roller being for movement between a first roller position towards a rear of the track and where the handle is in the first position; and a second roller position at a front of the track and where the handle is in the second position.

20. A wheelchair as claimed in claim 19, wherein the roller is adapted to push on the top plate to force the upper member and thus the at least one support column downwardly.

21. A wheelchair as claimed in claim 20, wherein the at least one compression spring is compressed by movement of the upper member under the action of the roller.

22. A wheelchair as claimed in claim 16, wherein the handle is pivotally mounted to a base plate intermediate the length of the handle and comprises an outer portion and an inner portion, the outer portion and the inner portion being joined by an offset portion.

23. A wheelchair as claimed in claim 22, wherein when the wheel assembly is in the extended position the wheel assembly is not lower than a major wheel of the wheelchair to enable the major wheel to contact the ground to retain the ability to drive the wheelchair.

24. A wheelchair as claimed in claim 23, wherein the major wheel is rotatably mounted to the lower member by an axle that engages a bearing that locates in a through-hole in the lower member.

25. A wheelchair as claimed in claim 24, wherein each gap-crossing mechanism is located between a main frame of the wheelchair and each major wheel.

26. A wheelchair as claimed in claim 25, wherein the bearing is also located in a second hole in the base plate so that the major wheel is rotatable relative to the gap-clearing mechanism as well as the main frame.

27. A wheelchair as claimed in claim 26, wherein the upper member and lower member are pivotally mounted to the main frame.

28. A wheelchair as claimed in claim 15, wherein the at least one support column is slideably mounted in corresponding at least one opening through the lower member.

29. A wheelchair as claimed in claim 15, wherein the at least one support column is able to move relative to the lower member in the direction of a longitudinal axis of the at least one support column, but not laterally.

30. A wheelchair as claimed in claim 15, wherein the wheel assembly, when in the extended position, limits the wheelchair so that it can move in a straight line forwards or reverse and is unable to turn without difficulty.

31. A wheelchair as claimed in claim 15, wherein the wheel assembly comprises a plurality of wheels rotatably mounted between a pair of parallel and spaced-apart identical side plates.

32. A wheelchair as claimed in claim 31, wherein a forward wheel that is the most forward of the plurality of wheels is elevated relative to the others of the plurality of wheels; and the side plates are angled upwardly at their front end.

* * * * *